(No Model.)

D. S. MARSH.

STEAM GENERATING FURNACE.

No. 368,346. Patented Aug. 16, 1887.

WITNESSES:
John T. Nelson
Frances M. Brown.

INVENTOR:
David S. Marsh.
by his Attorneys
Brown Bros.

UNITED STATES PATENT OFFICE.

DAVID S. MARSH, OF WALTHAM, MASSACHUSETTS.

STEAM-GENERATING FURNACE.

SPECIFICATION forming part of Letters Patent No. 368,346, dated August 16, 1887.

Application filed November 30, 1886. Serial No. 220,265. (No model.)

*To all whom it may concern:*

Be it known that I, DAVID S. MARSH, of Waltham, in the county of Middlesex and State of Massachusetts, have invented certain new and useful Improvements in Steam-Generating Furnaces, of which the following is a full, clear, and exact description.

This invention consists in the combination and arrangement within the combustion and fire chambers of a furnace of otherwise suitable construction of a water-reservoir located in the upper portion of the combustion-chamber, and a water-drum located below said water-reservoir and within the fire pot or chamber of the furnace and connected by pipes with the chamber of the water-reservoir, and all otherwise for a continuous circulation of the water through the water-reservoir and water-drum, to be thereby generated into steam to be used for heating purposes, as may be desired, substantially as hereinafter described.

Figure 1:
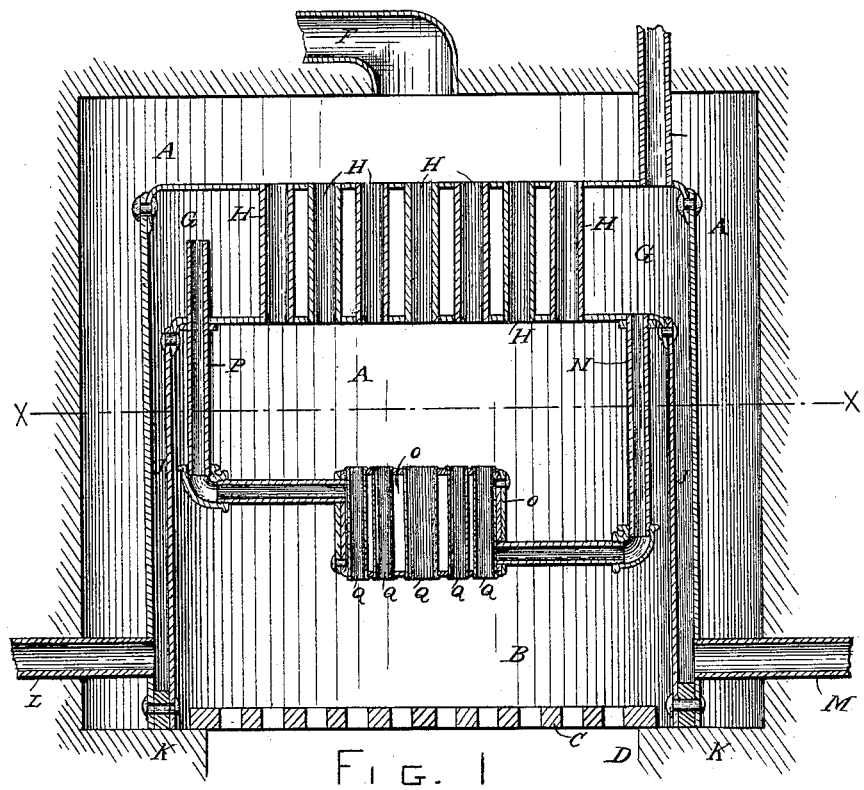
Figure 2:
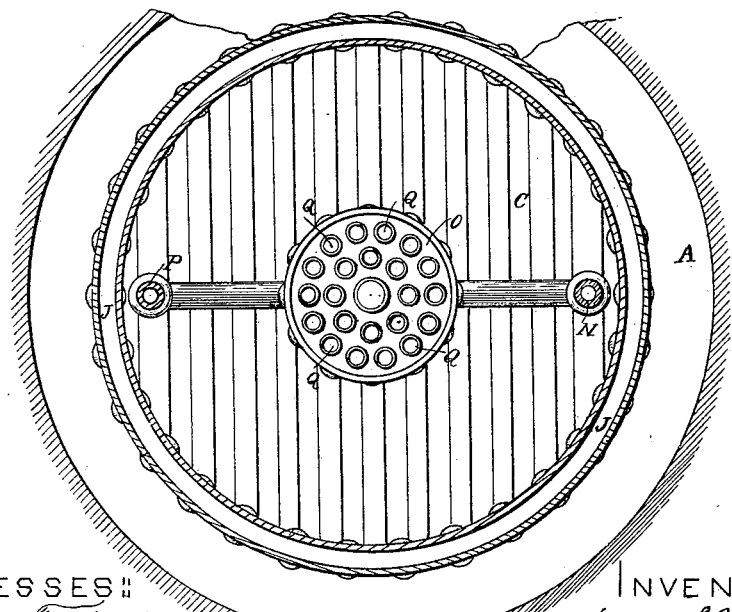

In the drawings forming part of this specification, Figure 1 is a central vertical section of the improved steam-generating apparatus; and Fig. 2 is a horizontal section on line $x\ x$, Fig. 1.

In the drawings, A represents the combustion-chamber of a furnace, and B is the pot or chamber, C the fire grate, D the ash-pit, F the passage to the chimney or flue from the combustion-chamber, all as usual in furnaces, and therefore needing no particular description herein.

G is a water-reservoir, of cylindrical shape, located in the upper portion of the combustion-chamber A, and preferably provided with flue-tubes H through it; and J is a water-leg, which is continuous with the water-reservoir G and extends downward, and at its lower end rests upon a suitable support at K around the fire-grate C. The water-reservoir G and its water-leg J are made of plate-iron, or of other suitable iron or material and in any suitable manner, and an inlet, L, is provided for water to be entered into the leg J of the water-reservoir, to be therein heated and generated into steam, and the steam so generated to be conducted off, and through steam-radiators or otherwise to be used for heating purposes.

M is a pipe through which to empty the water-reservoir G.

The water-reservoir G, located in the upper part of the combustion-chamber A, as above described, has a vertical pipe, N, which leads from its under side and makes connection with a vertical water-drum, O, and at the lower portion thereof. This drum is located within the fire pot or chamber B of the furnace, so that in the operation of the furnace it will be surrounded by and embedded, as it were, in the fuel thereof, and at the opposite side to that at which it is connected with the water-reservoir G, through a vertical pipe, N, as above described, the water-drum O is connected at its upper portion through a vertical pipe, P, with the upper part of the water-reservoir. The water-drum O, as shown, is provided with a series of vertical fire-flues, Q, open at either end to the combustion and fire chambers of the furnace.

The combination of water-reservoir G and water-drum O and their arrangement within the combustion-chamber and fire-chamber of the furnace, with pipe-connections between the two, all substantially as described, secures a most perfect and rapid heating of the water and its generation into steam, and a most active circulation of water for such purposes through the water-reservoir and water-drum from the former into the latter and from the latter into the former, and so on.

The vertical flues Q and H may be more or less in number, and the flues Q may be dispensed with; but it is preferable to use them.

Having thus described my invention, what I claim, and desire to secure by Letters Patent, is—

1. In a heating and steam-generating furnace, in combination, a water-drum, O, located in the fire-pot of the furnace, vertical water-tubes N P, connected to said drum, a cylindrical water-reservoir, G, located in and surrounded by the combustion-chamber A and above and directly connected by said water-tubes to said drum, vertical flue or flues H through said reservoir G and both ends open to the combustion-chamber, a vertical water-leg, J, leading downward from said reservoir and about the combustion-chamber, an inlet and outlet for water connected to said water-leg, and a pipe for the escape of steam from said reservoir, substantially as described, for the purpose specified.

2. In a heating and steam-generating furnace, in combination, a water-drum, O, located in the fire-pot of the furnace, vertical fire flue or flues Q, passing through said drum and both ends open to the fire-pot, vertical water-tubes N P, connected to said drum, a cylindrical water-reservoir, G, located in and surrounded by the combustion-chamber A and above and directly connected by said water-tubes to said drum, vertical flue or flues H through said reservoir G and both ends open to the combustion-chamber, a vertical water-leg, J, leading downward from said reservoir and about the combustion-chamber, an inlet and outlet for water connected to said water-leg, and a pipe for the escape of steam from said reservoir, substantially as described, for the purposes specified.

In testimony whereof I have hereunto set my hand in the presence of two subscribing witnesses.

D. S. MARSH.

Witnesses:
ALBERT W. BROWN,
FRANCES M. BROWN.